(12) United States Patent
Cortes

(10) Patent No.: US 8,930,522 B2
(45) Date of Patent: Jan. 6, 2015

(54) REPLICA/CACHE LOCATOR, AN OVERLAY NETWORK AND A METHOD TO LOCATE REPLICATION TABLES AND CACHES THEREIN

(75) Inventor: Mauricio Cortes, Scotch Plains, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1214 days.

(21) Appl. No.: 11/772,012

(22) Filed: Jun. 29, 2007

(65) Prior Publication Data

US 2009/0006593 A1    Jan. 1, 2009

(51) Int. Cl.
*G06F 15/16* (2006.01)
*H04L 12/66* (2006.01)

(52) U.S. Cl.
CPC .................................... *H04L 12/66* (2013.01)
USPC ........... 709/224; 709/223; 709/213; 709/229; 709/238

(58) Field of Classification Search
USPC ....................................................... 709/238
See application file for complete search history.

(56) References Cited

U.S. PATENT DOCUMENTS

| | | | | |
|---|---|---|---|---|
| 6,502,175 | B1 * | 12/2002 | Krishnan et al. | 711/170 |
| 7,069,323 | B2 * | 6/2006 | Gardos et al. | 709/225 |
| 7,089,323 | B2 * | 8/2006 | Theimer et al. | 709/238 |
| 7,496,663 | B2 * | 2/2009 | Haley et al. | 709/224 |
| 7,555,527 | B1 * | 6/2009 | Slaughter et al. | 709/213 |
| 2003/0154238 | A1 * | 8/2003 | Murphy et al. | 709/201 |
| 2005/0058081 | A1 * | 3/2005 | Elliott | 370/252 |
| 2005/0198328 | A1 * | 9/2005 | Lee et al. | 709/229 |
| 2005/0240591 | A1 * | 10/2005 | Marceau et al. | 707/9 |
| 2006/0050651 | A1 * | 3/2006 | Brignone et al. | 370/254 |
| 2007/0050497 | A1 * | 3/2007 | Haley et al. | 709/224 |
| 2007/0282915 | A1 * | 12/2007 | Vosshall et al. | 707/200 |
| 2008/0177873 | A1 * | 7/2008 | Ni et al. | 709/223 |
| 2008/0270822 | A1 * | 10/2008 | Fan et al. | 714/4 |
| 2008/0270882 | A1 * | 10/2008 | Rollins et al. | 715/208 |

OTHER PUBLICATIONS

Dabek, et al.; "Vivaldi: A Decentralized Network Coordinate System;" MIT CSAIL; Cambridge, MA; fdabek,rsc,kaashoek,rtm@mit.edu; (12 pgs.).

Gupta, et al.; "Efficient Routing for Peer-to-Peer Overlays;" MIT CSAIL; {anjali,liskov,rodrigo}@csail.mit.edu; (14 pgs.).

* cited by examiner

*Primary Examiner* — Hamza Algibhah
*Assistant Examiner* — Natisha Cox
(74) *Attorney, Agent, or Firm* — Hitt Gaines, PC

(57) ABSTRACT

A replica/cache locator, a method to locate replication tables and caches in an overlay network having multiple nodes and an overlay network. In one embodiment, the method includes: (1) determining a network distance between a first node of the multiple nodes in the overlay network and each of the remaining multiple nodes, (2) calculating m clusters of the multiple nodes based on the network distances and (3) designating at least a single node from the m clusters to include a replication table of the first node.

24 Claims, 3 Drawing Sheets

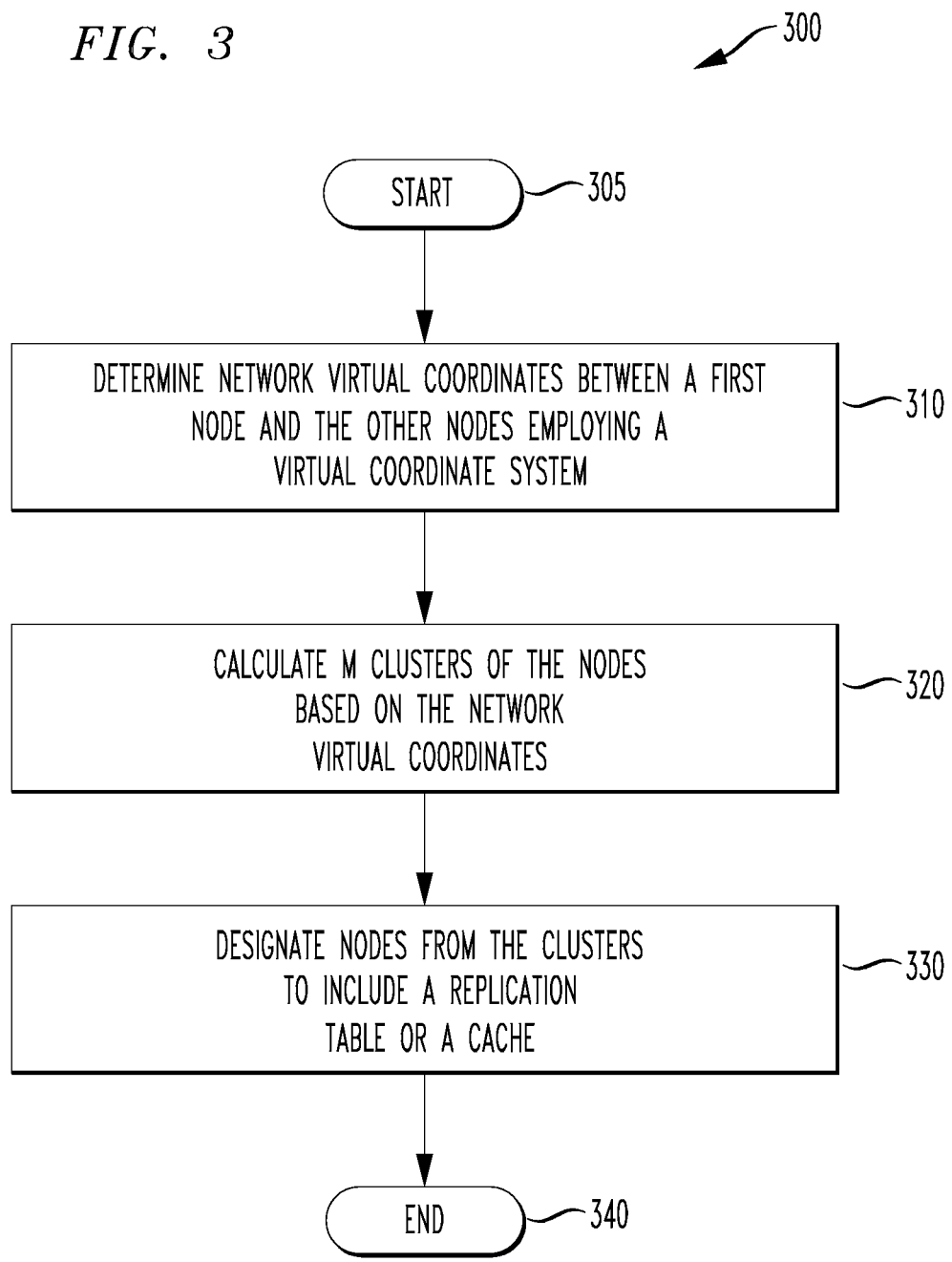

REPLICA/CACHE LOCATOR, AN OVERLAY NETWORK AND A METHOD TO LOCATE REPLICATION TABLES AND CACHES THEREIN

TECHNICAL FIELD OF THE INVENTION

The present invention is directed, in general, to content-based, application-level routing and, more specifically, to locating replication tables and caches in a network to minimize routing latency.

BACKGROUND OF THE INVENTION

Multiple mechanisms, using various structures and having a range of response times, are employed to answer queries in communications networks. Domain Name System (DNS) is an example of such an existing mechanism for single-attribute queries (e.g., Internet Protocol (IP) address, mail server). DNS is a worldwide hierarchical distributed database that enables companies to be responsible of one or more database fragments. The distributed database supports the translation between a fully qualified domain name (FQDN) and an IP address.

DNS is often used in a naming service. A naming service provides mapping between a user identifier and the location of applications in the communications network. For example, Internet service providers (ISP) and Internet applications, such as Voice over Internet Protocol (VoIP) employ a naming service to convert a name into a physical address through a process referred to as naming resolution.

There are well-known mechanisms in Peer-to-peer (P2P) technology that are used to store address information such that end-users can retrieve it at a later time. P2P technology includes unstructured and structured P2P networks. An unstructured P2P network includes nodes that have limited or no knowledge of the information held by other peer nodes (peers). Typically, the unstructured P2P networks have an amorphous geometry, such as those used by Kazaa®, distributed by Sharman Networks Limited, and Skype®, distributed by Skype Limited Corporation, which provide an environment that is useful for highly volatile peers that continuously join and leave the P2P network.

Unlike DNS, which is a single-attribute query, many P2P networks allow users to place multi-attribute queries. That is, a user can ask for the entries that meet several criteria (e.g., age, gender, language, etc.). However, since the average peer lifetime is less than an hour, a limited amount of information can be stored in the peer nodes. In a P2P network, name to address translation is done cooperatively between peer nodes. The translation operation is sent to one or more node neighbors. In turn, the nodes will forward the query to neighbor nodes if it cannot perform the address translation.

In a structured P2P network, each node has a partial or total knowledge of the information held by other nodes. Typically, these networks form a geometric figure such as a tree, mesh, ring, or hypercube. Each peer has a routing table with the appropriate entries to exchange messages with its neighbors. The routing table enables the peer node to forward messages in the right direction. The routing table may be a distributed hash table (DHT), such as Chord and Pastry, which use a hashing function in every node. Each node is part of a ring and contains a routing table of other participating nodes. The size of the routing table is $\log_b N$, where N is the number of nodes in the network. Similarly, the number of (application-level) hops needed to find the appropriate node to answer a query is in average $\log_b N$.

Some P2P networks allow each node to store a routing table with N entries, one per node, which allows a one-hop solution to queries. This approach represents a fully connected graph at the application level. The one-hop structure is often used in low churn P2P networks, where peers remain in the network for long periods of time. Any update to the P2P network such a new node joining or a node leaving, modifies the routing table in every node. These updates are propagated using a two level hierarchy, where each node report changes to a slice leader. In turn, slice leaders periodically report changes to group leaders. These group leaders exchange update messages among themselves, and forward the new changes down to the slice leaders, who will forward them to individual nodes. The slice leaders and the group leaders are both peers and are configured to select a new leader in case a leader is saturated or dies.

DNS and P2P, therefore, provide mechanisms for responding to queries such as those queries used in a naming service. The caching scheme in DNS, however, has a limited or no reactive mechanism to update the different caches. As such, some query responses return stale information. Stale information is of particularly importance for mobile users where IP addresses can change at relatively short intervals.

Additionally, the average DNS response time varies from one geographic region to the next since most DNS servers are concentrated in one region, i.e., United States. The 98-percentile response time can vary from 0.05 seconds to 11 seconds due to various considerations including: server concentration in one geographic region, DNS server overload, ill-configured DNS servers, long timeout periods and hierarchical lookup starting from root servers. Range query requests and multi-attribute queries are also not supported in DNS.

As noted above, unstructured P2P networks include no or limited knowledge of information stored at a neighboring node. Thus, a user requests has to be propagated exponentially through out the network. Further, an imprecise answer can be returned to the sender, since a query of all the nodes is not assured. Thus, the information can be stored one or more hops away from any of the visited nodes.

Though many mechanisms exist for responding to queries, improvements in the art would prove beneficial.

SUMMARY OF THE INVENTION

The present invention provides a replica/cache locator, methods to locate replication tables and caches in an overlay network having multiple nodes and an overlay network. In one embodiment, the replica/cache locator includes: (1) a coordinate determiner configured to determine network virtual coordinates between a first node in an overlay network and each remaining node in the overlay network, (2) a node clusterer coupled to the coordinate determiner and configured to calculate m clusters of nodes in the overlay network based on the network virtual coordinates, and (3) a replica/cache manager coupled to the node clusterer and configured to designate a node from the m clusters to include a replication table of the first node.

In another aspect, the invention provides the method to locate replication tables. In one embodiment, the method includes: (1) determining network virtual coordinates between a first node of the multiple nodes in the overlay network and each of the remaining multiple nodes, (2) calculating m clusters of the multiple nodes based on the network virtual coordinates, and (3) designating a node from the m clusters to include a replication table of the first node.

In yet another aspect, the invention provides the overlay network. In one embodiment, the overlay network includes multiple nodes coupled in a ring, wherein at least a first node of the multiple nodes includes: (1) a content table having a sorted partition of domain data in a (key, value) pair form, (2) a flat routing table configured to associate an IP address of each of the multiple nodes with a corresponding range of keys and (3) a replica/cache locator. The replica/cache locator includes: (3A) a coordinate determiner configured to determine network virtual coordinates between the first node and each remaining node of the multiple nodes, (3B) a node clusterer coupled to the coordinate determiner and configured to calculate m clusters of the multiple nodes based on the network virtual coordinates and (3C) a replica/cache manager coupled to the node clusterer and configured to designate a single node from the m clusters to include a replication table of the first node.

In still another aspect, the invention provides the method to locate caches in an overlay network having multiple nodes. In one embodiment, the method includes: (1) determining network virtual coordinates between a first node of the multiple nodes in the overlay network and each of the remaining multiple nodes and (2) designating, based on the virtual coordinates, at least a single node of the multiple nodes to include a cache of the first node.

The foregoing has outlined features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIG. 3 illustrates a flow diagram of an embodiment of a method of locating replication tables and caches in a communications network carried out according to the principles of the present invention.

DETAILED DESCRIPTION

When responding to queries, a highly available system and method are desired that provides correct responses with a low latency. Replication tables and caches within a network can support such a low latency, highly available system. Locating caches and replication tables within a network, however, can be challenging. The present invention locates replication tables and caches to increase accessibility and reduce latency in a network. A virtual coordinate system is employed to determine locations for replication tables and caches in a network. A central controller for the network is not used but instead, each node in the network can move replication tables and caches around to other nodes. Each node uses the virtual coordinate system to add new nodes to the network, forward queries to the proper node for answering and locate replication tables and caches within the network.

Each node (peer) of the network maintains a routing table with virtual coordinates of all the ongoing nodes in the network. The virtual coordinates are used to represent relationships or attributes of the nodes and the network. The virtual coordinates can represent, for example, network distances between nodes which can be used to represent latency there between, jitter, time of queries, etc. The virtual coordinates are calculated by each node by piggybacking on queries (thus small overhead) exchanged between the nodes. Each of the nodes determines the virtual coordinates with all other nodes based on these measurements obtained from the queries. Multiple queries may be sent to determine the virtual coordinates. For example, multiple queries may be needed to determine jitter. Based on the virtual coordinates, each node can determine which node should be in its cluster of nodes for replicating and caching its own information.

Figure 1:
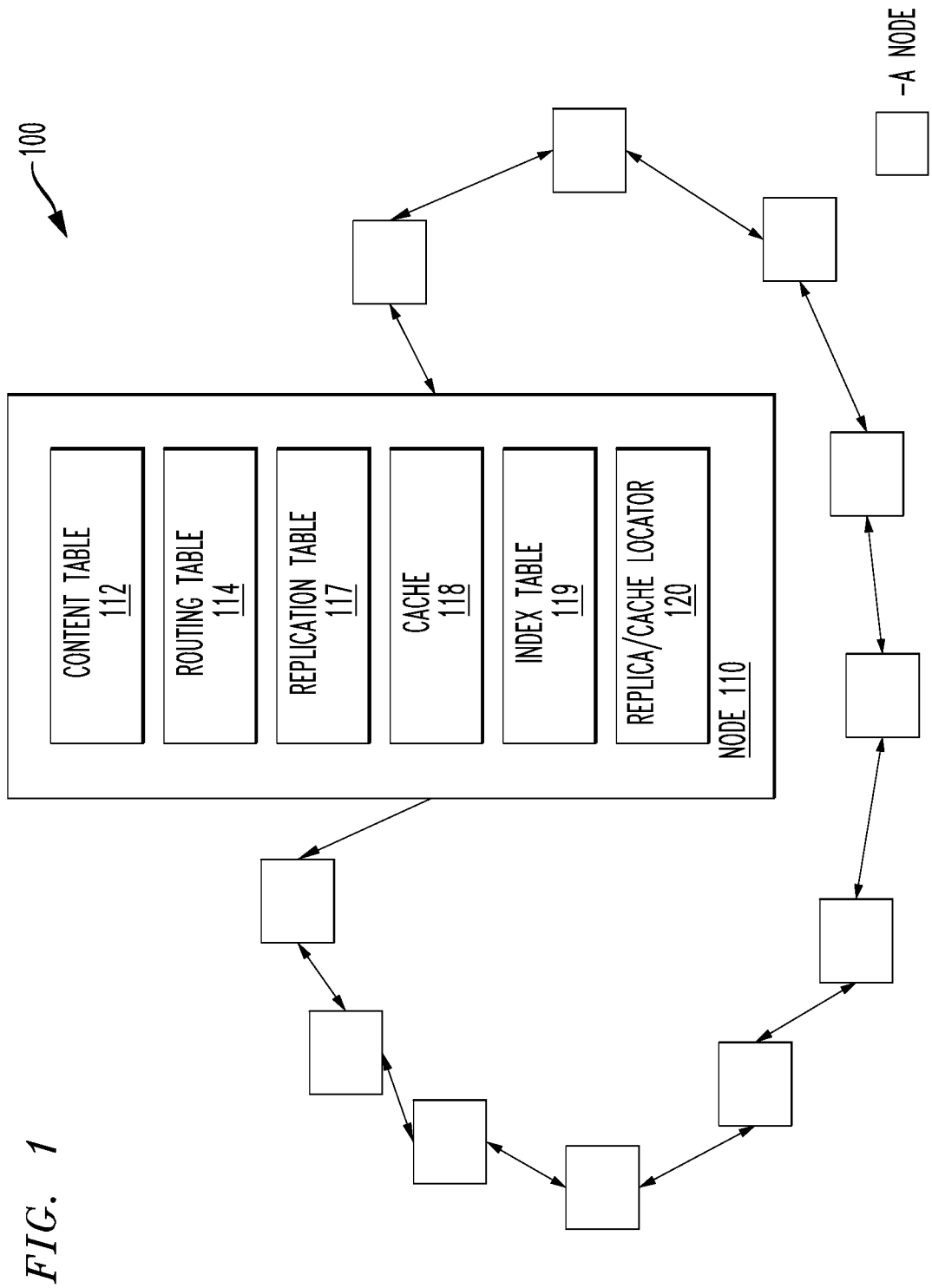
FIG. 1 illustrates a system diagram of an embodiment of an overlay network constructed according to the principles of the present invention.

Referring initially to FIG. 1, illustrated is a system diagram of an embodiment of an overlay network 100 constructed according to the principles of the present invention. The overlay network 100 includes multiples nodes arranged in a ring. The overlay network 100 is a structured peer-to-peer network constructed on top of a communications network such as, for example, the Internet. Each of the multiple nodes in the overlay network 100 is connected by virtual links to the other multiples nodes. The virtual links correspond to a path in the communications network that may include multiple physical links. The overlay network 100 is a one-hop network that can be extended to accommodate replication for Byzantine Fault-Tolerance. Multiple enterprises may own, control or operate various nodes within the overlay network 100.

A node refers to a computing machine, such as a server, that stores user information including different attributes. The nodes of the overlay network 100 are dedicated nodes that are long-lived (i.e., the nodes remain on the communications network for a long period of time resulting in a low churn in the overlay network 100). A representative node of the multiple nodes in FIG. 1 is designated 110. A new node to the overlay network 100 determines a location in the ring by querying an existing node (an ongoing node), such as node 110, of the ring.

Node 110 includes a content table 112, a routing table 114, a replication table 117, a cache 118, an index table 119 and a replica/cache locator 120. The content table 112 includes a sorted partition of the domain data in the form (key, value) pair such as (FQDN, IP address) or (SIP proxy name, IP address). The partition is sorted such that each node is responsible for a well-defined range of key values. A partition is defined such that an intersection of any two content tables is empty and a union of all the content tables is equal to the whole domain of the overlay network 100.

The routing table 114 represents each of the multiple nodes present in the overlay network 110. The routing table 114 is a flat table that associates each node's IP address with the corresponding range of keys. The routing table 114 also stores the address of the k closest neighbor nodes, where k=1, . . . , n/2, and n represents the number of nodes in the overlay network 100.

The replication table 117 is a copy of a neighboring node's content table. The replication table 117 may include copies from multiple nodes or from a single node. The neighbors' addresses in the routing table 114 are used to keep track if the neighbors are alive. The replication table 117 is used to assume operations of a neighbor node in case of a failure. The replication table 117 is updated periodically to maintain it in sync with any updates to the original content table at the neighbor node. Similarly, any change on the routing table 114 is propagated to replication tables of the content table 112 that are located at another or other nodes of the overlay network 100. The propagation of the changes is performed employing the one-hop approach.

In addition to the replication tables, each node of the overlay network 100 also has a designated set of nodes that act as caches for the node's information. As such, as with the replication table 117, the cache 118 is a cache for another node of the overlay network 100. The primary difference between a cache and a replication table is that a replication table has all the information of a content table whereas a cache only stores popular records (those that have been requested often) that have been requested. A single node of the overlay network 100 may not include both a cache and a replication table.

The first node 110 also includes the index table 119 configured to define relationships for secondary attributes associated with the overlay network 100. The index table 119 represents a secondary key attribute (e.g., SSN, geographic location, network location, etc). Similar to the content table 112, the index table 119 is partitioned and distributed in one or more nodes of the overlay network 100. Just as the routing table 114 for the primary attribute, the index table 119 is a routing table that defines relationships for each secondary attribute when present. The index table 119 helps the node 110 to forward queries to a correct node with the appropriate local index table. No additional replication is necessary, reducing the bandwidth requirements to support secondary attributes.

When multiple attributes are used, multiple overlays are used with an overlay employed for each attribute. Though not scalable to an arbitrary number of attributes, the multiple overlays are sufficient when the number of attributes is small (e.g., less than 10). In FIG. 1, a single attribute is used and designated as the primary attribute. The single attribute is unique for each record stored in the overlay network 100. The overlay for the primary attribute, overlay network 100, is referred to as the primary overlay.

The replica/cache locator 120 is configured to designate a node or nodes, referred to as a replica or replicas, in the overlay network 100 to include a replication table of the content table 112. The replica/cache locator 120 includes a coordinate determiner, a node clusterer and a replica/cache manager which are not illustrated in FIG. 1. The replica/cache locator 120 is discussed in more detail with respect to FIG. 2.

The replica/cache locator 120 may employ an algorithm implemented as a series of computer instructions. The algorithm may be distributed on each node of the overlay network 100. Additionally, the replica/cache locator 120 may include dedicated hardware, general purpose hardware or a combination thereof.

The replica/cache locator 120 selects replicas and caches that are at a sufficient network distance from the node 110 such that a network partition will not bring the overlay network 100 down. Additionally, the replica/cache locator 120 selects a replica or cache sufficiently close to the node 110 to minimize network latency.

Node 110 has the network virtual coordinates to every other node in the overlay network 100. Using these network virtual coordinates, the replica/cache locator 120 calculates m clusters of nodes. The node selects at least one node from the m clusters to hold a replication table of the content table 110. In some embodiments, multiples nodes from the m clusters may be selected to hold a replication table. For example, a single node from four of the m clusters (i.e., a total of four nodes of the overlay network 100) may be selected to hold a replication table. This is true for systems needing to be in service 99.999% of the time (i.e., 5 nines). Regardless of in-service requirements, at most, one node from each of the m clusters is selected to hold a replication table. In contrast, multiple nodes from a single cluster of the m clusters may be selected to hold a cache.

Using a geographic analogy and network distances for the virtual coordinates, each node of the overlay network 100 resides in some continent and knows the network distance to each of the other nodes. These network distances help the node to find the nodes on each of the other continents. By allowing each node to pick a representative on each continent, any operation posed by any other node can be performed in the same continent. Since network distances do not map to geographic locations, the replica/cache locator 120 does not rely on geographic information, but on network distances that are calculated by each node. Addresses for each of the replicas for node 110 are stored in the routing table 114.

A user employs the overlay network 100 by connecting to one of the nodes in the overlay network 100. Users are entities that store and retrieve records from the nodes using registration messages and queries. The users can be mobile and the time logged into the overlay network 100 can vary. Each user may employ an identifier of the form <user-id>@domain where the user-id is unique in the domain.

A user has prior knowledge of a set of nodes that it can contact in the overlay network 100, either by querying a website to get node addresses or by a pre-configured list of nodes available in the application software of the user. Once the user is connected to a node, referred to as the user's proxy, the user registers with the overlay network 100. The user may register by issuing a register request with a user-id and other optional information. The request message is routed to the node, referred to as the user's home node, which stores the user's record. The home node, for example, may be node 110. The home node makes note of the user's presence and adds the current user location and the location of the proxy into the user record stored in the content table 112. The user record is also updated at all replication tables and caches of the home node. When queries for this user are generated at any node in the overlay network 100, the queries are routed to one of the nodes maintaining the user record. The node that receives the query, then responds with information about the user's presence in the overlay network 100 and its current location. Nodes that have the user record include the home node (node 110), a node with a replication table of the content table 112, or a node having a cache of node 110 that can respond to the query.

The address space of the overlay network 100 is the set of all possible user or service identifiers. Each node in the overlay network 100 is responsible for an address range in the address space. This address range encompasses a set of user-ids and the node acts as the home node for the users. For example, if the address range assigned to the node 110 is [a-f]*, then node 110 is the home node for user-ids aa, aaaa, b, foobar, etc. Each node of the overlay network 100 also has knowledge of the address ranges stored on all other nodes therein via the routing tables. Thus, to route a query for any user-id, a node simply looks up the node responsible for the particular address range and forwards the query to it in a single hop (a one-hop system). To answer range queries, i.e., queries of the form "user-ids matching foo*", the node forwards the query to all the nodes whose address ranges match the query.

Each node's information from its content table is also replicated at other nodes in the overlay network 100. As noted above, the replica/cache locator 120 selects locations, other nodes, for the replication tables of node 110. When a node makes a query to a node which is down, i.e., a down node, it then contacts the nodes with a replication table (or possibly a cache) of the down node's data to satisfy the query. Thus, a query will get a response from the overlay network 100, barring the failure of a node and all the designated replication tables.

As represented in node 110, each node also has a designated set of nodes that act as caches for the node's information. Initially, a cache does not maintain any records. When a proxy node contacts the cache with a query for a user record, the cache checks if the user record is already in the cache. If it is, the query is answered, but if the record is not in the cache, the cache then fetches the user record from the home node, inserts the record into its cache and responds to the query.

Each node in the overlay network 100 also maintains a set of network virtual coordinates. The information for the virtual coordinates is piggy-backed on the messages that are exchanged between the nodes. Using these coordinates, the overlay network 100 can improve operations. Initially, when a user is connecting to its proxy node by selecting a node from an available set, the proxy node can choose to connect to the node which is closest to it in the virtual coordinate space. Using these coordinates, the replication tables and caches for a node's data are selected to be widely spread across the underlying network. This ensures that a network outage in the underlying network in one region would not affect access to all replicas of a node's data. Also, when responding to a query, a node can elect to contact a close replica instead of the actual node to reduce the latency of the response. Occasionally, a randomly selected replica or cache may be selected to update the distance between this node and all other nodes. The distance is calculated as the difference between the time the request leaves the node, and the time the response arrives back to the node.

When a node determines its location in the overlay network 100, such as a new node or due to a failure of an existing node, a node will ask an ongoing node. The ongoing node will determine the new position based on the load of all other ongoing nodes, as well as the network virtual coordinate between the new node and its possible neighbors. The loading information is piggy-backed in network administration messages that are transmitted between the nodes of the overlay network 100. To reduce vulnerability to network partitions, the new node is not assigned close by a neighbor node. However, the new node is also not assigned a great distance from neighbor nodes to minimize propagation of replica updates.

Once the new node gets the address of the new neighbor from the ongoing node, it will join the ring by contacting the new neighbor directly. The new node receives the virtual coordinates from the ongoing node. The new node will transform these virtual coordinates centered at the ongoing node to be centered at the new node using the coordinates of the new node with respect to the ongoing node. In this way, the new node does not need to exchange messages with all of the other nodes but instead uses the new virtual coordinates as a first approximation. The virtual coordinates can then be continuously updated with subsequent queries as discussed above.

The neighbor node will send the following information: a contiguous fraction of the content table, addresses of its neighbors, and the global routing table. Once the new node has received this information, it can inform all nodes, for example through the region leaders, of the changes in the routing table (new node address, and the range of addresses for the new node and the neighbor).

When responding to a query, each node of the overlay network 100 can answer a query directly if the information is stored locally, either in the original content table for that node, a replication table or a caching from some other node. For example, node 110 can answer a query if the content table 112 includes information for the query. Alternatively, node 110 can also answer the query if the replication table 117 or the cache 118 includes the needed information that is from another node of the overlay network 100. If neither condition holds, the node 110 will forward the query to a selected node of the overlay network 100. The selected node is chosen using data ranges of the selected node's local routing table. Using the virtual coordinates associated with the selected node, caches and replicas thereof, the node 110 will forward the query to the closest one.

To maintain the replicas up to date, any change to an original content table is propagated to each and every replica. A tradeoff, therefore, exists between response time and bandwidth. For m~n, the response time is close to zero, but the bandwidth needed to maintain all the replicas is excessively high. In contrast, m<<n the response time is a fraction of the network average latency and the bandwidth is within a practical range.

To balance load across the overlay network 100, each overloaded node can shed the initial/final subrange of (key, value) pair to a corresponding neighbor. Recall that a neighbor may already have the information stored in a replication table. Therefore, the cost of shedding a subrange of (key, value) pairs reduces to the update of the routing table. In order to avoid oscillation due to shedding, any pairs of nodes can shed a subrange in one direction at a time.

A second strategy to balance load is to employ a few spare nodes that can be coupled next to an overloaded node to split the overloaded node's content table. This allows sharing the load between the new node and the overloaded node. In some embodiments, the overloaded node requests the spare node to join. If two or more nodes are overloaded, the spare node will arbitrate the join requests from each of the overloaded nodes.

A third strategy to balance load is to allow lightly loaded ongoing nodes using the load information being shared by all nodes to detect hot spots, leave the network, and immediately join the network next to the overloaded node. In this embodiment, the overloaded node will arbitrate between any two or more nodes that request to share its load.

Figure 2:
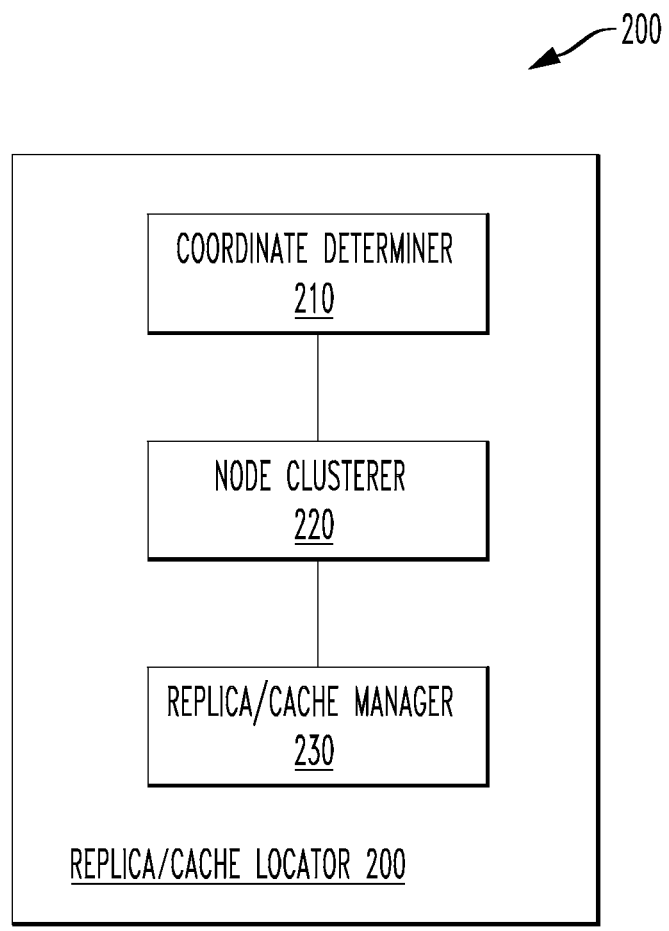
FIG. 2 illustrates a block diagram of an embodiment of a replica/cache locator constructed according to the principles of the present invention.

Turning now to FIG. 2, illustrated is an embodiment of a replica/cache locator, generally designated 200, constructed according to the principles of the present invention. The replica/cache locator 200 includes a coordinate determiner 210, a node clusterer 220 and a replica/cache manager 230. The replica/cache locator 200 is configured to designate nodes, referred to as replicas or caches, in an overlay network, such as the overlay network 100, to include a replication table of a content table or a cache. The overlay network may be an overlay network as disclosed in the article entitled "Efficient Routing for Peer-to-Peer Overlays" by Anjali Gupta, et al., which is included herein by reference in its entirety. The replica/cache locator 200 may employ an algorithm implemented as a series of computer instructions to direct general purpose hardware. The replica/cache locator 200 may include dedicated hardware, general purpose hardware or a combination thereof.

The replica/cache locator 200 selects replicas and caches that are at a sufficient network distance from the replicated node such that a network partition will not bring the overlay network down. Additionally, the replica/cache locator 200 selects a replica or cache sufficiently close to the replicated or cached node to minimize network latency. The replica/cache locator 200 uses the same clustering algorithm for locating the caches and the replicas. However, different goals are used to select the actual nodes. Replicas are typically selected to be closer to the replicated node while caches tend be scattered throughout the network.

Considering selecting replicas in more detail, each node has the network virtual coordinates to every other node in the overlay network. Using these virtual coordinates, the replicated node calculates m clusters of nodes. Each cluster may have about the same number of nodes. The node selects at least one node from the clusters to hold the replication table. In some embodiments, the number of nodes selected as replicas is based on network availability requirements, network reliability, etc. For example, to meet 99.999% availability requirements, at least four nodes may be selected from the clusters to hold a replication table. Therefore, there would be a total of at least four replicas. To meet lower availability requirements, fewer nodes may be selected.

The coordinate determiner 210 is configured to determine network virtual coordinates between the replicated node in the overlay network and each remaining node therein employing a virtual coordinate system. The replicated node calculates virtual coordinates of all the other multiple nodes through information that is "piggy-backed" on queries there between. The virtual coordinate system may comprise a series of computer instructions representing an algorithm that assigns synthetic coordinates to nodes such that, for example, the network distance between the coordinates of the nodes accurately predicts the communication latency between the nodes. The algorithm may be the Vivaldi algorithm described in the paper entitled "Vivaldi: A Decentralized Network Coordinate System," by Frank Dabek, et al., which is incorporated herein by reference in its entirety. In addition to network distances and latency, the virtual coordinates can also represent jitter, query probe times, etc.

The replicated node may use the virtual coordinates for various tasks including locating replicas. Using the virtual coordinates, replicas are selected to be widely spread across the underlying communications network. This ensures that an outage in the underlying network in one region would not affect access to all replicas of a node's data. Also, when responding to a query, a node can elect to contact a close replica instead of the actual replicated node to reduce the latency of the response. As with replicas, the virtual coordinates can be used to locate data caches, too. Additionally, when a user is initially connecting to its proxy node by selecting a node from an available set, the user can choose to connect to the closest node in virtual coordinate space.

The node clusterer 220 is coupled to the coordinate determiner 210 and configured to calculate m clusters of nodes in the overlay network based on the network virtual coordinates. In some embodiments, some clusters may contain dynamic information (i.e., "hot" information) and therefore may be larger than other clusters. In other embodiments, each of the m clusters may have approximately a same number of nodes or the same number of nodes.

The replica/cache manager 230, coupled to the node clusterer 220, is configured to designate a node from the m clusters to include a replication table of the replicated node. The node designated from each cluster to include a replication table may be referred to as a coordinator (region leader) for the cluster for concurrency control purposes. Another node from one of the m clusters is also designated to include the replication table to take over for the coordinator node in case of failure. Multiple nodes may be selected to include replication tables to insure high availability. Typically, however, a single cluster will not have more than a single replica.

The replication table is a copy of the content table of the replicated node. The replication table may be used to assume operations of the replicated node in case of a failure. The replication table is updated periodically to maintain it in sync with any updates to the content table. Similarly, any change to the routing table of the replicated node is propagated to the replication tables employing the one-hop approach.

FIG. 3 illustrates a flow diagram of an embodiment of a method 300 to locate replication tables or caches in an overlay network having multiple nodes carried out according to the principles of the present invention. The method 300 may be implemented as a sequence of operating instructions located in a computing device of at least one node of the overlay network. The method may be implemented in each node of the overlay network. The overlay network may be a one-hop, peer-to-peer network that is placed over a communications network, such as the Internet. The method 300 begins in a step 305 with an intent to start.

After starting, network virtual coordinates between a first node of the multiple nodes in the overlay network and each of the remaining multiple nodes is determined in a step 310 employing a virtual coordinate system. Each of the multiple nodes is coupled via the virtual coordinate system. The network virtual coordinates may be determined by calculating the difference in time between a request message and a corresponding response message between a first node and each of the remaining multiple nodes in the overlay network. In some embodiments, multiple request messages may be sent to determine the virtual coordinates.

After determining the network virtual coordinates, m clusters of the multiple nodes are calculated based on the network virtual coordinates in a step 320. Clustering of the nodes occurs in discrete steps. After some time interval, each node evaluates if caches and replicas are located within acceptable time and load bounds. Both latency to all nodes and load of all nodes are continuously changing, therefore each of the nodes has to evaluate if conditions have changed to modify its decision on where to place caches and replicas.

Nodes from the m clusters are then designated to include a replication table or a cache of the first node in a step 330. The replication table includes a copy of a content table of the first node. The content table is a sorted partition of domain data of the overlay network in a (key, value) pair form.

The number of caches and or replicas that are designated in each cluster depends on several factors. In high availability environments (e.g., 99.999%) the network requires at least four replicas regardless of the number of clusters. Likewise, if a table entry becomes hot (being requested by a lot of queries), caches may be established in all clusters or even in two or more nodes of the same cluster.

The number of caches depend on how hot entries are being queried, how hot entries are being updated, how much bandwidth is available in the network, and how loaded is the node. The number of replicas depend directly on the availability of the system and the reliability of the components. If the network components fail frequently (low MBTF), then a higher number of replicas would be needed. However, if the network components rarely fail (high MBTF), then the number of replicas needed is low. After designating nodes to include a replication table or cache, the method 300 ends in a step 340.

Although the present invention has been described in detail, those skilled in the art should understand that they can make various changes, substitutions and alterations herein without departing from the spirit and scope of the invention in its broadest form.

What is claimed is:

1. A replica/cache locator, comprising:
    a coordinate determiner configured to calculate network virtual coordinates between a first node in an overlay network and each remaining node in said overlay network;
    a node clusterer coupled to said coordinate determiner and configured to calculate m clusters of nodes in said overlay network based on said network virtual coordinates; and
    a replica/cache manager coupled to said node clusterer and configured to designate a node from at least one of said m clusters to include a replication table of said first node and more than one node in each of said m clusters to include a cache of said first node, said nodes designated by said replica/cache manager based on locations of said nodes in said overlay network.

2. The replica/cache locator as recited in claim 1 wherein said coordinate determiner is configured to update said network virtual coordinates by forwarding a query to a randomly selected replica node, cache node or said first node.

3. The replica/cache locator as recited in claim 1 wherein said coordinate determiner is configured to calculate said network virtual coordinates based on multiple queries.

4. The replica/cache locator as recited in claim 1 wherein said coordinate determiner is configured to calculate said network virtual coordinates between a first node in an overlay network and each remaining node in said overlay network by piggybacking on queries exchanged between said first node and said each remaining node.

5. The replica/cache locator as recited in claim 1 wherein said replica/cache manager is configured to designate multiple nodes from said m clusters to include a replication table of said first node.

6. The replica/cache locator as recited in claim 2 wherein said replica/cache manager is further configured to designate more than one node in each of said m clusters to include a cache of said first node based on reducing latency associated with responding to said queries.

7. The replica/cache locator as recited in claim 6 wherein said replica/cache manager is further configured to use different goals for designating said node for said replication table of said first node and said more than one nodes for said cache of said first node.

8. The replica/cache locator as recited in claim 1 wherein said replica/cache manager is configured to designate at most a single node in each of said m clusters to include said replication table.

9. A computer implemented method to locate replication tables in an overlay network having multiple nodes, comprising:
    determining network virtual coordinates between a first node of said multiple nodes in said overlay network and each of remaining nodes of said multiple nodes;
    calculating m clusters of said multiple nodes based on said network virtual coordinates; and
    designating a node from at least one of said m clusters to include a replication table of said first node and more than one node in each of said m clusters to include a cache of said first node, wherein each node of said overlay network is configured to know the location of said designated nodes.

10. The method as recited in claim 9 wherein said designating includes designating no more than a single node in each of said m clusters to include said replication table.

11. The method as recited in claim 9 wherein said replication table includes a copy of a content table of said first node and said content table is a sorted partition of domain data of said overlay network in a key-value pair form.

12. The method as recited in claim 9 wherein said m clusters have an unequal amount of nodes.

13. The method as recited in claim 9 wherein each of said multiple nodes are coupled via said virtual coordinate system.

14. The method as recited in claim 9 further comprising designating at most a single node from any one of said m clusters to include said replication table of said first node.

15. The method as recited in claim 9 wherein at least four nodes are designated to include said replication table.

16. The method as recited in claim 9 wherein said designating is based on reliability of components of said network.

17. The method as recited in claim 9 wherein said designating is based on availability requirement of said network.

18. An overlay network, comprising:
    multiple nodes coupled in a ring, wherein at least a first node of said multiple nodes includes:
        a content table having a sorted partition of domain data in a key-value pair form;
        a flat routing table configured to associate an IP address of each of said multiple nodes with a corresponding range of keys; and
    wherein each node of said multiples nodes includes a replica/cache locator, including:
        a coordinate determiner configured to determine network virtual coordinates between said first node and each remaining node of said multiple nodes;
        a node clusterer coupled to said coordinate determiner and configured to calculate m clusters of said multiple nodes based on said network virtual coordinates; and
        a replica/cache manager coupled to said node clusterer and configured to designate a node from at least one of said m clusters to include a replication table of said first node and more than one node in each of said m clusters to include a cache of said first node.

19. The overlay network as recited in claim 18, wherein each node of said multiple nodes is configured to send said network virtual coordinates to a new node in said overlay network, wherein said new node in said overlay network is configured to transform said network virtual coordinates to be centered at said new node based on queries associated with said new node.

20. The overlay network as recited in claim 18 wherein said node clusterer is further configured to calculate said m clusters based on dynamic information associated with some of said multiple nodes.

21. The overlay network as recited in claim 20 wherein one of said m clusters includes more nodes than at least another of said m clusters, said one including said some of said multiple nodes with said dynamic information.

22. A computer implemented method to locate caches in an overlay network having multiple nodes, comprising:
    determining network virtual coordinates between a first node of said multiple nodes in said overlay network and each of said remaining nodes of said multiple nodes;
    calculating, by employing a processor, m clusters of said multiple nodes based on said network virtual coordinates; and
    designating a node from at least one of said m clusters to include a replication table of said first node and more than one node in each of said m clusters to include a cache of said first node based on reducing latency associated with responding to said queries.

23. The method as recited in claim 22, wherein said designating includes designating a number of nodes for a replication table of said first node, said number based on a network availability requirement and independent of a number of clusters in said m clusters.

24. The method as recited in claim 23, wherein said designating includes designating at most a single node in each of said m clusters to include said replication table.

* * * * *